Dec. 29, 1942.　　　　G. CORDINGLEY　　　　2,306,989
CABLE REEL GUARD
Filed Aug. 29, 1941　　　　2 Sheets-Sheet 1
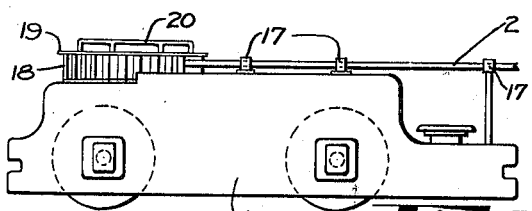
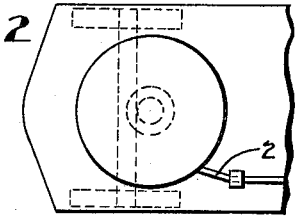
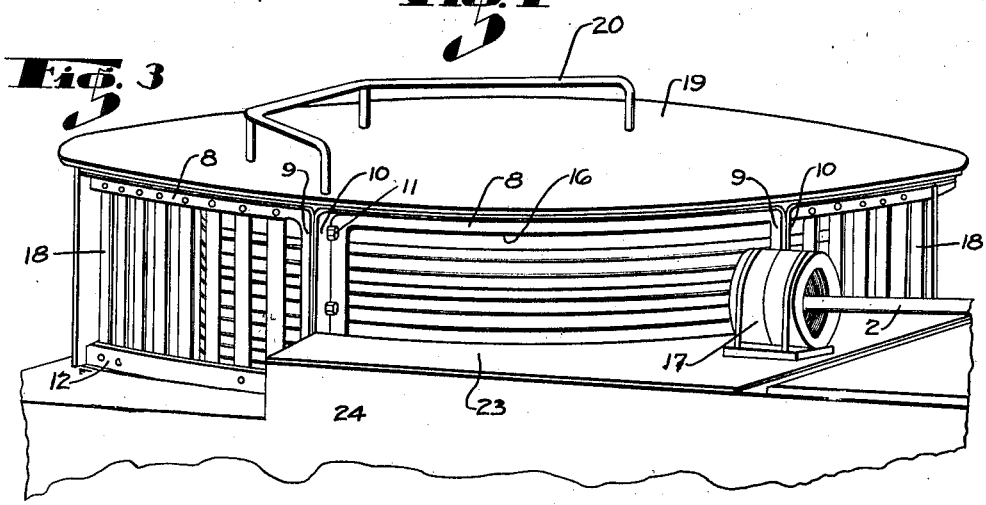
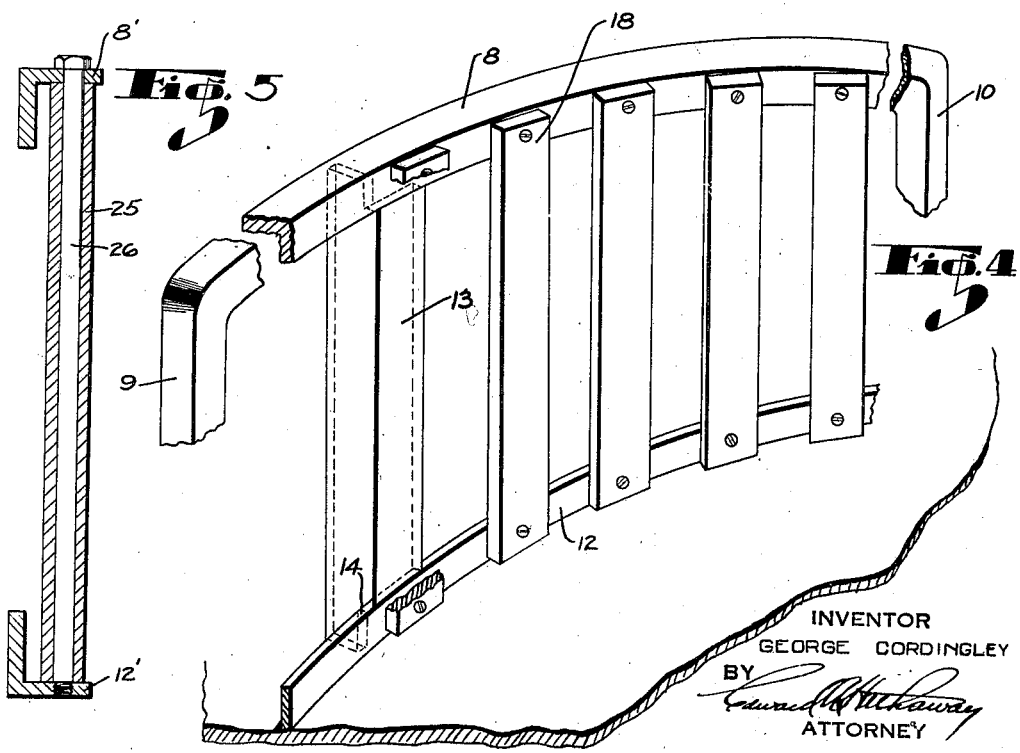
INVENTOR
GEORGE CORDINGLEY
BY
ATTORNEY Dec. 29, 1942.       G. CORDINGLEY       2,306,989
CABLE REEL GUARD
Filed Aug. 29, 1941         2 Sheets-Sheet 2

INVENTOR
GEORGE CORDINGLEY
BY
ATTORNEY

Patented Dec. 29, 1942

2,306,989

UNITED STATES PATENT OFFICE 2,306,989

CABLE REEL GUARD

George Cordingley, Drexel Hill, Pa., assignor to The Baldwin Locomotive Works, a corporation of Pennsylvania Application August 29, 1941, Serial No. 408,829

3 Claims. (Cl. 242—91)

This invention relates generally to cable reel locomotives such as are generally used in coal mines and similar places and it relates more particularly to an improved cable reel guard.

In this type of locomotive current is supplied through an insulated cable conductor which is either wound onto or paid out from a rotatable reel mounted usually on top of the locomotive. In case of damage to the cable insulation there is considerable possibility of danger due to short circuiting or arcing, particularly during winding or unwinding from the reel especially where certain types of reel guards are employed as here the cable may be thrown outwardly against the guard either by centrifugal force or the cable is apt to be loosely wound on to the reel or wound in such a manner as to be jammed between the reel and guard. It is also necessary to ventilate the reel to prevent overheating of the cable which may be subject to appreciable heating which tends to deteriorate the cable insulation. Furthermore, the guards must have considerable strength and durability due to the general service conditions under which they operate and this has heretofore required structural elements which, due to their arrangement and structural characteristics, have constituted either an actual or potential source of causing arcing or short circuiting of a cable with damaged insulation.

Various arrangements have heretofore been suggested and used in an attempt to overcome the foregoing difficulties but they have been deficient in many respects either functionally or structurally.

It is an object of my invention to provide an improved cable reel guard that will perform its guard functions while at the same time having a high degree of strength, rigidity and durability but with minimum possibility of short circuiting a cable with injured insulation.

Another object is to provide an improved cable reel guard that is relatively simple and economical in construction, operation and maintenance; that is efficient in protecting a cable against short circuiting and yet has a desired degree of compactness combined with maximum ventilating capacity.

Other objects and advantages will be more apparent to those skilled in the art from the following description of the accompanying drawings in which:

Fig. 1 is a side elevation of a mine locomotive employing my cable reel guard;

Fig. 2 is a fragmentary plan view of the cable reel end of the locomotive;

Fig. 3 is a perspective of my improved guard;

Fig. 4 is an enlarged fragmentary perspective of one portion of my improved guard;

Fig. 5 is a fragmentary sectional view of a modified form of guard element;

Figure 6:
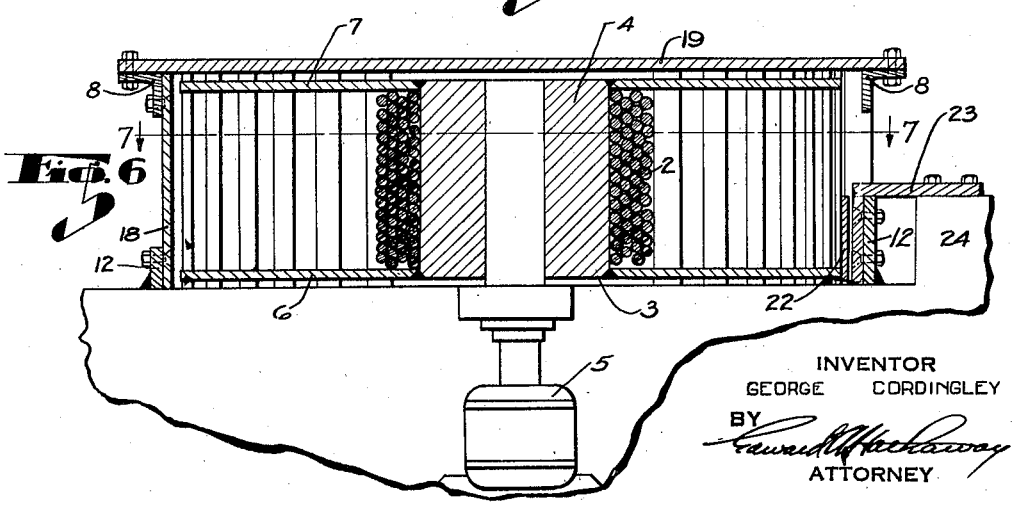
Fig. 6 is a vertical sectional view through a reel enclosed within my improved guard.

In the drawings I have shown a mine locomotive 1 which may be considered as of any usual or conventional type employing a conductor cable 2 which is wound upon a suitable drum or reel 3, Fig. 6. This reel has a hub 4 driven in any suitable manner such as by an electric motor 5 combined with upper and lower reel flanges 6 and 7. This reel is suitably supported preferably on the top rear end of the locomotive 1.

Figure 7:
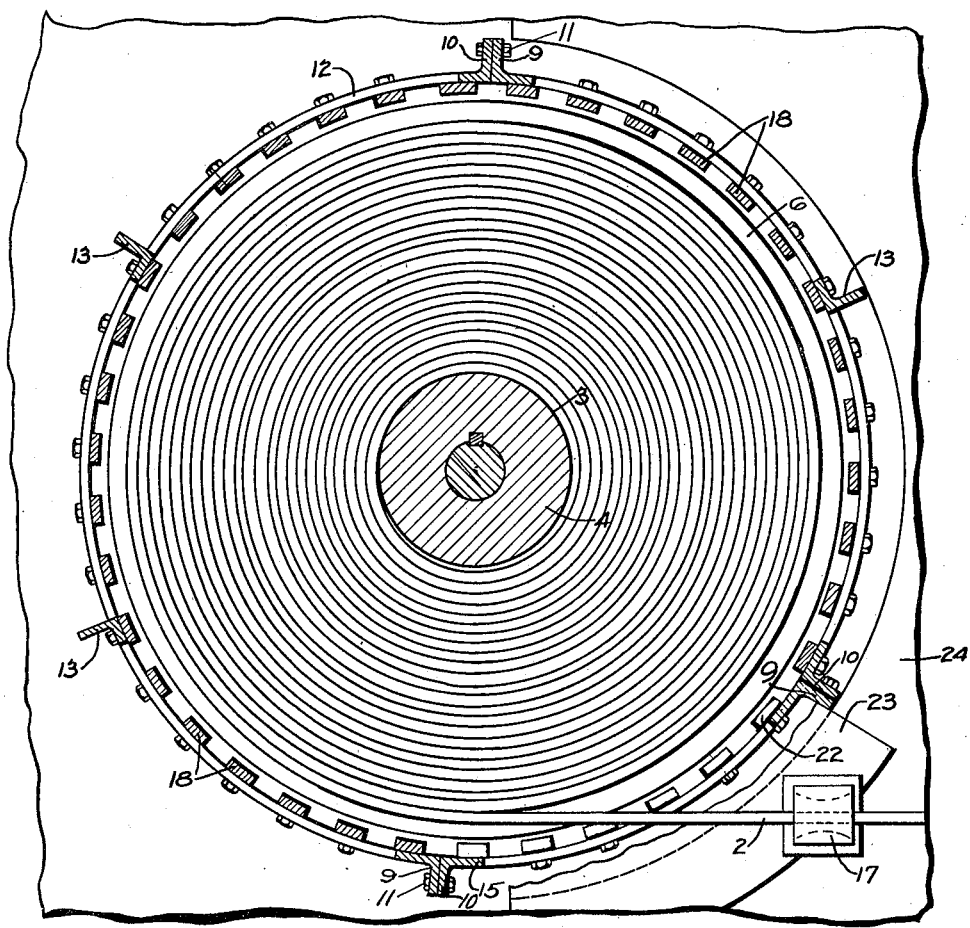
Fig. 7 is a horizontal section taken substantially on the line 7—7 of Fig. 6.

My improved reel guard comprises a skeleton frame formed of segmentally arranged structural angle iron supports 8, Figs. 3 and 4, have downwardly turned legs 9 and 10. These frame sections can be divided into as many segments as desired and the segments are joined together by having the legs 9 and 10 of adjacent segments secured together as by bolts 11 or by welding, if desired. The legs 9 and 10 of each segment extend for the desired height of the guard and preferably rest on top of the locomotive 1. A lower circular supporting band 12, Figs. 4 and 6, extends continuously around the circumference of the guard in segments corresponding to the frame segments and may be welded or otherwise suitably secured to the locomotive frame 1 and also the frame legs 9 and 10 may be secured to this circular band thereby forming a rigid frame structure. This may be reinforced by structural angle irons 13, Fig. 4, preferably being cut out as at 14 to receive the inner vertical flange of the angle irons 8 and the circular band 12. Several of these reinforcements are shown in Fig. 7, and also three segmental frame sections are shown, two of which are relatively large and another, 15, having a relatively short segmental length. The short segmental section 15 provides an unrestricted opening 16, Fig. 3, through which the cable is guided by a usual cable guide 17. A cover 19 may be supported on the frame and in turn support any other usual accessories such as handrail 20. The cover 19 rests upon the angle iron 8 and is bolted or otherwise suitably secured thereto. Supported by the foregoing guard frame is a series of circumferentially spaced vertical insulation strips 18 which are secured at their upper and lower ends to the angle iron frames 8 and circular strip 12. Also vertical insulation strips 22, Figs. 6 and 7, extend upwardly just to the bottom of the opening 16 preferably adjacent to a horizontal insulation wear plate 23 secured on top of the raised portion 24 of the locomotive frame.

The insulation strips may be formed of Bakelite, Micarta or any other usual or suitable insulation material, but in any event it will be observed that they do not perform any frame supporting function and yet the strips are of such thickness and width as to have self sufficient strength and rigidity to resist any rubbing or jamming by the cable conductor even though the entire supporting action for the strips is taken merely through the skeleton framework as above described. This skeleton frame leaves the insulation strips free to perform solely a guard function and they have the advantage of not only constituting the entire thickness of the guard at its effective area but of also extending throughout the entire height of the reel guard. Hence it is seen that there is no opportunity for the cable 2 to come in contact with the metal framework and that the possibility of such contact is reduced to a bare minimum even though some of the strips should become broken. Furthermore in my improved guard arrangement the strength of the insulation strips is measurably helped in that when a lateral force is applied to the strips so as to slightly bend the same, such as when the cable strikes or jams against them, they are immediately put into tension because of being connected at both their upper and lower ends to a rigid frame. Thus I am able to utilize the tensile strength of the insulation material and this additionally offers the possibility of some resiliency in case of the cable tending to become jammed. Ordinarily insulation material is relatively weak and hence occasionally a perforated metallic backing-up wall is employed for sheet insulation but by segregating the frame supporting and insulating functions to the extent disclosed herein, as by supporting the insulating members on the frame in a simple and direct manner, I am able to provide an economical and yet thoroughly rugged and efficient reel guard.

From the foregoing disclosure, it is seen that I have provided an extremely simple, rugged and yet efficient reel guard which is adapted to overcome the many disadvantages in prior art guards while retaining the advantages of an insulated type of guard. This arrangement is effective whether used with the flat type insulation strips 18 or whether the angle irons 8', Fig. 5, are turned inwardly to receive a plurality of cylindrical insulation sleeves 25 held in position by bolts 26 extending downwardly through the upper angle iron 8' and threaded into a lower circular angle iron 12' which corresponds to the circular strip 12 of Fig. 4. The sleeves 25 are freely rotatable on the bolts so as to wear evenly all around.

It will of course be understood that various changes in details of construction and arrangement of parts may be made by those skilled in the art without departing from the spirit of the invention as set forth in the appended claims.

I claim:

1. A cable reel guard for mine locomotives comprising, in combination, a circular frame formed of segmental sections having vertical supporting legs, means for joining said sections, and vertical insulation members supported on the inside of said frame at circumferentially spaced points thereof and operative to resist lateral forces only.

2. A cable reel guard for mine locomotives comprising, in combination, a guard having segmental angle iron sections, certain adjacent sections having horizontal portions whose adjacent ends are turned to a vertical position, means for clamping said adjacent vertical angle iron portions together to form a supporting leg for the frame, a lower horizontal frame member, and vertical insulation members supported upon said upper and lower horizontal frame sections and circumferentially spaced around the same and operative to resist lateral forces only.

3. A cable reel guard for mine locomotives comprising, in combination, a circular frame having upper and lower horizontal frame members connected by vertical frame supporting members, whereby said frame constitutes a rigid self supporting structure, and vertical insulation members secured to said upper and lower horizontal frame members and circumferentially spaced around the same whereby said insulation members are subjected to a tension force when an abnormally displaced cable engages said insulation strips so as to tend to bend the same during winding or unwinding of the cable.

GEORGE CORDINGLEY.